US007293264B2

(12) United States Patent
Bicsak et al.

(10) Patent No.: US 7,293,264 B2
(45) Date of Patent: Nov. 6, 2007

(54) METHOD AND A DEVICE FOR ABSTRACTING INSTRUCTION SEQUENCES WITH TAIL MERGING

(75) Inventors: Attila Bicsak, Helsinki (FI); Ákos Kiss, Szeged (HU); Gábor Lehotai, Sarosd (HU); Rudolf Ferenc, Szeged (HU); Tibor Gyimóthy, Szeged (HU)

(73) Assignee: Nokia Corporation, Espoo (FI)

( * ) Notice: Subject to any disclaimer, the term of this patent is extended or adjusted under 35 U.S.C. 154(b) by 611 days.

(21) Appl. No.: 10/667,140

(22) Filed: Sep. 17, 2003

(65) Prior Publication Data

US 2005/0060697 A1   Mar. 17, 2005

(51) Int. Cl.
G06F 9/45 (2006.01)
(52) U.S. Cl. .................. 717/156; 717/151; 717/154; 717/155; 717/157
(58) Field of Classification Search ........ 717/131–133, 717/140–141, 151–152, 159, 154–157
See application file for complete search history.

(56) References Cited

U.S. PATENT DOCUMENTS

| 4,953,084 | A | * | 8/1990 | Meloy et al. | 717/131 |
| 5,790,867 | A | * | 8/1998 | Schmidt et al. | 717/155 |
| 6,609,248 | B1 | * | 8/2003 | Srivastava et al. | 717/154 |
| 6,907,598 | B2 | * | 6/2005 | Fraser | 717/140 |

OTHER PUBLICATIONS

Sutter et al., "Sifting out the Mud: Low Level C++ Code Reuse" OOPSLA'02, ACM, Nov. 2002, pp. 275-291.*
Cooper et al, "Enhanced Code Compression for Embedded RISC Processors", SIGPLAN'99, ACM, 1999, pp. 139-149.*
Baker, Brenda S. "A Theory of Parameterized Pattern Matching: Algorithms and Applictions (Extended Abstract)" 25th ACM STOC, 1993, pp. 71-80.*
Debray et al., "Combining Global Code and Data Compaction", LCTES, ACM 2001, pp. 29-38.*
Beszedes et al., "Survey of Code-Size Reduction Methods", ACM Computing Surveys, vol. 35, No. 3, Sep. 2003, pp. 223-267.*
Chanet et al., "Post-Pass Compaction Techniques", Communications of the ACM, vol. 46, No. 8, Aug. 2003, pp. 41-46.*
Debray et al., "Compiler Techniques for Code Compation", ACM TOPLAS 2000, Presentation, pp. 1-39.*
Dae-Hwan Kim and Hyuk Jae Lee, "*Iterative Procedural Abstraction for Code Size Reduction,*" In Proceedings of CASES 2002, Oct. 8-11, 2002, Grenoble, France, pp. 277-279.

(Continued)

*Primary Examiner*—William H. Wood
(74) *Attorney, Agent, or Firm*—Alfred A. Fressola; Ware, Fressola, Van Der Sluys & Adolphson LLP

(57) ABSTRACT

A method and a device for abstracting instruction sequences in a computer program. First, a control flow graph of the program is generated and analysed in order to detect multiple occurrences of a same instruction sequence (504, 506). Then, a function including the longest sequence common to at least two instruction sequences from a plurality of sequences having a common instruction sequence of equal or shorter length compared to the longest sequence is created (512). Finally, the original occurrences of the instruction sequences in the plurality of sequences with a reference to a proper position in the newly created function are deleted and a reference to a proper position in the created function inserted instead (514).

16 Claims, 5 Drawing Sheets

OTHER PUBLICATIONS

Saumya Debray, William Evans, Robert Muth and Bjorn DeSutter, "*Compiler Techniques for Code Compaction*," ACM Transactions on Programming Languages and Systems, vol. 22, No. 2, Mar. 2000, pp. 378-415.

Cristina Cifuentes and K. John Gough, "*A Methodology for Decompilation*," XIX Conferencia Latinoamericana de Informatica, Buenos Aires, Argentina, Aug. 2-6, 1993, pp. 257-266.

* cited by examiner

302

| basic block-> | 1 | 2 | 3 | 4 | 5 | 6 |
|---|---|---|---|---|---|---|
| block end | A | A | G | A | G | D |
| bl. end -4 | B | B | E | B | E | S |
| bl. end -8 | C | J | A | C | A | J |
| bl. end -12 | D | E | D | D | A | B |
| bl. end -16 | E | G | H | E | S | C |
| bl. end -20 | F | A | F | S | D | D |
| bl. end -24 | G | D | V | A | F | E |
| bl. end -28 | H | K | B | O | L | G |
| bl. end -32 | I | A | A | E | U | S |
| bl. end -36 | G | I | H | W | E | O |
| bl. end -40 | K | T | U | E | W | T |
| bl. end -44 | L | S | W | R | Q | V |
| ...bl. start | ... | ... | ... | ... | ... | ... |

304

|   | 1 | 2 | 3 | 4 | 5 | 6 |
|---|---|---|---|---|---|---|
| 1 | 922 | 2 | 0 | 5 | 0 | 0 |
| 2 | 2 | 415 | 0 | 2 | 0 | 0 |
| 3 | 0 | 0 | 120 | 0 | 3 | 0 |
| 4 | 5 | 2 | 0 | 162 | 0 | 0 |
| 5 | 0 | 0 | 3 | 0 | 811 | 0 |
| 6 | 0 | 0 | 0 | 0 | 0 | 122 |

306

|   | 3 | 5 | 6 |
|---|---|---|---|
| 3 | 120 | 3 | 0 |
| 5 | 3 | 811 | 0 |
| 6 | 0 | 0 | 122 |

Figure 3

METHOD AND A DEVICE FOR ABSTRACTING INSTRUCTION SEQUENCES WITH TAIL MERGING

FIELD OF THE INVENTION

The present invention relates generally to software engineering. In particular, the invention concerns procedural abstraction of instruction sequences in a computer program in order to compact the code size.

BACKGROUND OF THE INVENTION

Nowadays, according to the ongoing trend in the software development industry, a single computer program is typically constructed as a multi-element structure including several modules taking care of the differentiated functionalities the overall program product is planned to offer to the user. The modules are independently compiled and then finally linked together after compilation to form the executable. Although most compilers are able to perform optimizations on the generated code, the range of the optimization is limited to a module or—more frequently—to a function. Generally, linkers that merge together the compiled modules do not perform further optimizations on the code. Thus, any global optimizations are not performed.

Since merging everything into a single source file is usually not a feasible alternative even if standard module specific optimisation techniques could be then applied thereto, as the program maintainability and code re-usability is lost, the only acceptable solution—provided that an internal representation is not already available—is to analyze the program and build a corresponding control flow graph (CFG), which is the basis of most, if not all, optimization techniques at post-link time.

Building a CFG of a binary program is not a trivial task because high-level control structures usually do not exist on the binary code level. However, a few techniques still exist for performing the task with adequate precision. Cristina Cifuentes et al., see reference 1 (at end of specification), have worked on binary code analysis. Their goal was to retrieve high language statements from binary code. The results were tested on Intel Pentium and Sun SPARC machines. An executable is not created from the CFG. Saumya K. Debray et al., see reference 2, have created a post-link time optimizer specifically for Alpha processors.

FIG. 1 discloses a partial CFG constructed from an executable program. It includes several levels of hierarchy, namely root level 102, section level 104, 112, function level 106, and basic block level 108. For example, whenever there is a section node in the COFF (Common Object File Format) file containing the executable (or in a binary executable of some other type) that is loaded, a corresponding section node is inserted in the CFG during the construction thereof. In every text section 104 a function node 106 exists for every non-label symbol in the COFF file, and every function comprises basic blocks 108. Basic blocks 108 comprise instructions 110 (optionally data as well) that may refer 118 to data elements 114 that are included in a separate data section 112. There are edges 116, 118 of various types in the CFG, which connect nodes. For example, call edges 116 represent calls of a function from another function and address edges 118 connect instructions or data nodes to functions, basic blocks or other instructions or data nodes. The presented CFG is an example only and several varying possibilities exist for creating flow graphs with slightly different hierarchy, building blocks or edges still utilizing substantially the same basic principles.

In general terms, compaction refers to modification of binary executable programs in such a way that they retain their original behavior with a smaller memory footprint. If a CFG is available, the transformations may be applied on the graph, thus decreasing its size but maintaining the meaning thereof and finally synthesizing a new executable from the graph. Compaction is very useful in areas where memory footprint is essential, e.g. embedded systems. Procedural abstraction is a compaction technique where multiple instances of identical instruction sequences are replaced by calls to a function containing the same instruction sequence extracted from the original location. However, currently used procedural abstraction techniques either work only on whole basic blocks in the CFG or even when they are able to abstract out parts of basic blocks they do no analyse the tails of instruction sequences for further optimization.

Debray et al., reference 2, describe an algorithm to abstract out blocks to procedures, but the described technique abstracts only whole blocks. The time complexity of the algorithm is $O(n^2)$ where n is the number of basic blocks.

Kim and Lee, see reference 3, describe a graph based algorithm to determine which parts of a basic block to abstract out to achieve maximum compaction, but the solution presented in the paper does not take the possibility of merging the tails of abstracted instruction sequences into account. The time complexity is $O(n^3)$.

SUMMARY OF THE INVENTION

The object of the present invention is to improve the existing procedural abstraction techniques with a novel method and a device utilizing that method, in which the possibility of merging the tails of the abstracted procedures is taken into account when deciding what instruction sequences to abstract. It is advantageous to embed the tail merging procedure into the procedural abstraction itself. If the tail merging is done after procedural abstraction, the achieved compaction will be worse than could be attained with the incorporated model.

The invention offers many advantages over the prior art. The code compression ratio can be improved if compared to prior art compaction techniques, though the time complexity of the algorithm remains reasonable. An improved code compression ratio results in a smaller program size thus consuming less memory space. The method of the invention is easy to implement and the results produced can be analysed with ease from the compacted code.

According to the invention, a method for procedural abstraction of instruction sequences in a computer program comprises the steps of creating a control flow graph of the program, said flow graph including basic blocks of instructions, traversing through the basic blocks in order to detect multiple occurrences of a same instruction sequence, creating a function including the longest sequence common to at least two instruction sequences from a plurality of sequences having a common instruction sequence of equal or shorter length compared to said longest sequence, replacing the original occurrences of said instruction sequences in said plurality of sequences with a reference to a proper position in said created function.

In another aspect of the invention, an electronic device for abstracting instruction sequences in a computer program, said device comprising processing means and memory means for processing and storing instructions and data, and data transfer means for accessing data, is arranged to create a control flow graph of the program, said flow graph including basic blocks of instructions, traverse through the basic blocks in order to detect multiple occurrences of a same instruction sequence, create a function including the longest sequence common to at least two instruction sequences from a plurality of sequences having a common instruction sequence of equal or shorter length compared to said longest sequence, and replace the original occurrences of said instruction sequences in said plurality of sequences with a reference to a proper position in said created function.

The term "instruction sequence" is used in a wide sense in the text. It refers to two or more successive elements of a computer program code or a derivative (graph element etc) thereof.

In an embodiment of the invention, the proposed abstraction technique is utilized in compacting a program code consisting of six basic blocks having partially identical code sequences embedded. Multiple occurrences of the same code are analysed and new functions formed with tail merging in order to compact the program size.

Dependent claims disclose preferred embodiments of the invention.

BRIEF DESCRIPTION OF THE DRAWINGS

Hereinafter the invention is described in more detail by reference to the attached drawings, wherein FIG. 1 discloses a partial CFG structure of a computer program.

FIG. 3 shows the progression of the method of the invention in an embodiment wherein the program code contains six separate basic blocks having partially common instruction sequences.

DETAILED DESCRIPTION OF THE PREFERRED EMBODIMENT OF THE INVENTION

Figure 1:
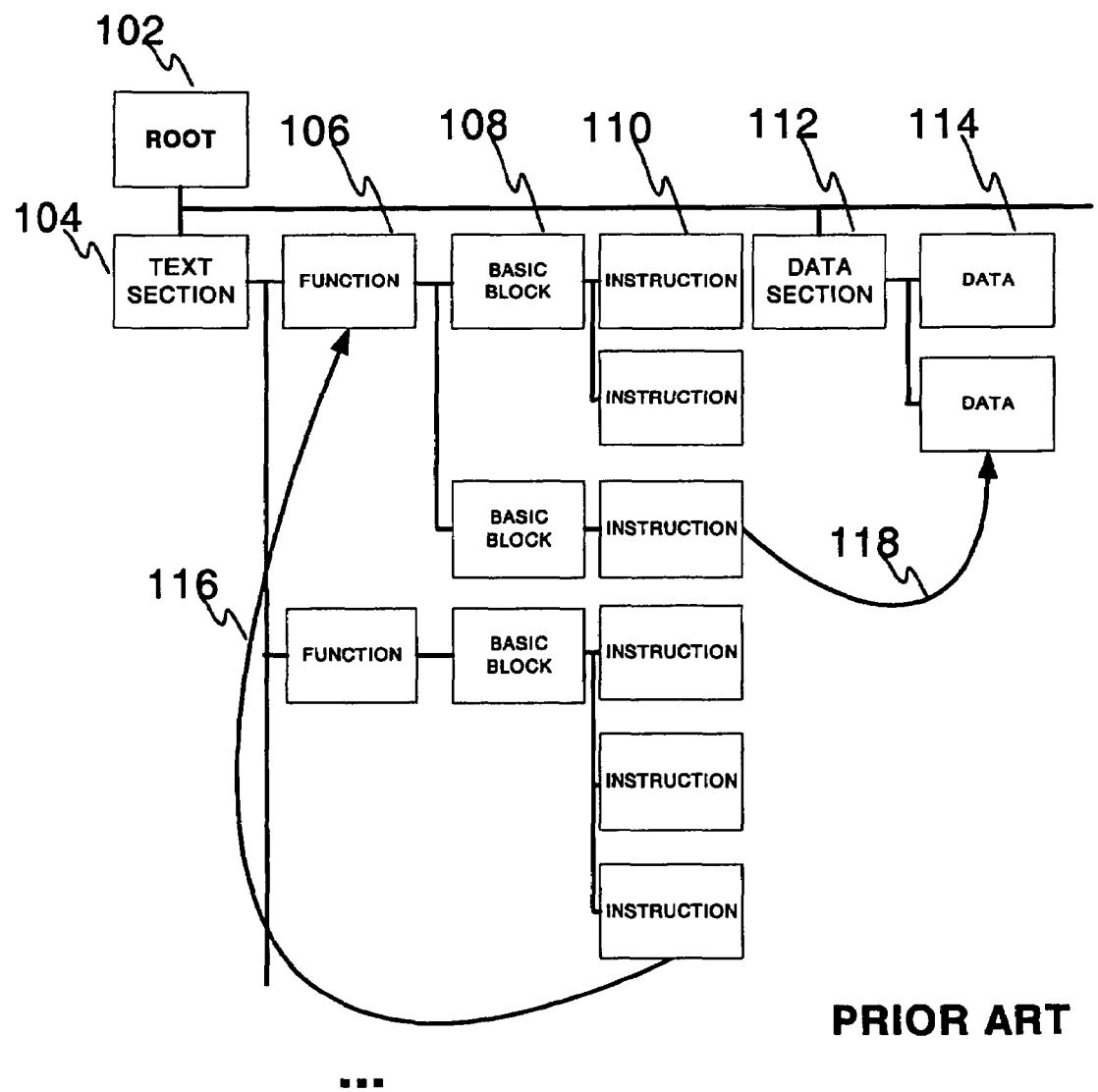
Figure 2:
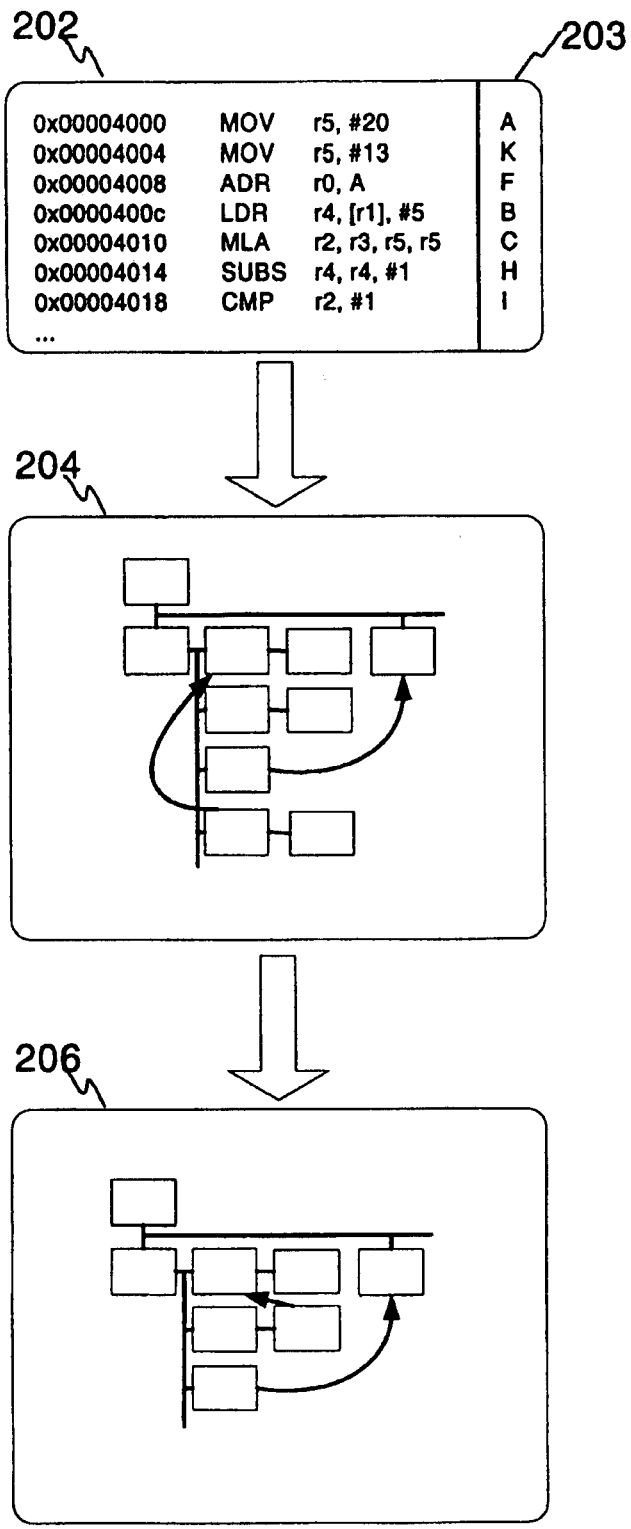
FIG. 2 illustrates an overall concept of the invention, wherein a computer program is read to the system of the invention, a CFG is created and finally optimised by utilizing the method of the invention.

FIG. 1 was already discussed in conjunction with the description of related prior art. FIG. 2 discloses, by way of example, the concept of the invention in general. An executable program, which is printed as displayed on e.g. a debugger user interface, 202 is first analysed using known techniques in order to obtain a CFG 204 of the program structure and flow thereof. Next the CFG is exposed to the procedural abstraction method of the invention, which results in a modified CFG structure 206 with identical instruction sequences extracted from their original positions and placed a function call instead to a separate function including the corresponding sequence only once. The newly created function may then include a plurality of entry points for different caller functions' use. The figure also includes character symbols, see legend 203, attached to instructions as an additional instruction identification, and are only used in order to facilitate an understanding of the following invention disclosure shown in FIG. 3.

An embodiment of the invention is first freely described with FIG. 3 wherein entity 302 represents last instructions (uppercase characters used as symbols for instructions as mentioned above) of basic blocks 1-6 in the program to be compacted. "Block end" corresponds to the memory location of the last instruction of the block, and the second to last instruction is correspondingly located at "block end"-4 wherein 4 means four bytes being equivalent to the instruction width (2 two-byte words) in this particular example. It can be seen from the figure that blocks 1, 2, and 4 have identical instruction sequences at the block end. Blocks 1, 2 and 2, 4 have two instructions in common while blocks 1, 4 have five instructions in common. Furthermore, blocks 3 and 5 have three instructions in common.

It should be noted that the optimization process is here aligned with basic block boundaries just to facilitate the understanding of the invention core. In practice it would be advantageous to first traverse through the code and mark all positions that have a common instruction sequence with a certain identifier. Then the entity 302 could be generated on the basis of these sequences found, the end points of which do not necessarily correspond to the basic block boundaries.

The algorithm of the invention that abstracts instruction sequences from basic blocks into new procedures with tail merging basically works as follows: initially it builds a data structure that helps find the best choice of basic blocks to abstract from and then continuously selects basic blocks and abstracts out instructions from them into new procedures while it is worth doing, i.e. it results in size reduction.

The decision supporting data structure can be presented as a matrix 304 where row and column numbering is congruent with the corresponding basic block id's. A cell in the intersection of a certain row and column tells how many instructions the block of the row number and the block of the column number have in common when calculated from the block end (i.e. common suffix length). Alternatively the number may tell the size of the common suffix e.g. in bytes or words. Line shading of cells corresponds to the one presented in entity 302.

Next, the algorithm decides what to abstract by calculating for every basic block the size reduction that would be achieved if the body of the investigated basic block would be copied into a new function and in all blocks having a common suffix with the investigated block (including the investigated block itself) the common suffix would be replaced with a function call into an appropriate position of the newly created function. The algorithm chooses the block where the calculated size reduction is the highest.

Once the algorithm has chosen a block it actually creates a new function with a body identical to the chosen block (and appends a return instruction to it). Next it replaces the body of the chosen block with a function call and replaces in every other block having a common suffix with the original chosen block, the common suffix with a function call also. Each function call points into the newly created function where the code identical with the appropriate replaced common suffix starts. This results in a function with multiple entry points, which can be also considered as a size optimized, tail merged version of multiple ordinary single entry functions. It is also possible to create a new function that holds only the longest common sequence of the chosen block and all the existing blocks are redirected to a proper position in the function. Thus the whole chosen block is not copied to the created function.

Finally, after one abstraction round is done the matrix is updated by deleting the rows and columns representing the blocks taking part in the abstraction, thus resulting a new matrix of lower dimension 306, and iterating the decision/abstraction process until there are blocks that are worth to abstract out. Therefore, the step from matrix 304 to matrix 306 includes merging of a common suffix in blocks 1, 2, and 4 into a separate function and updating the matrix structure with data left concerning blocks 3, 5, and 6.

Figure 4:
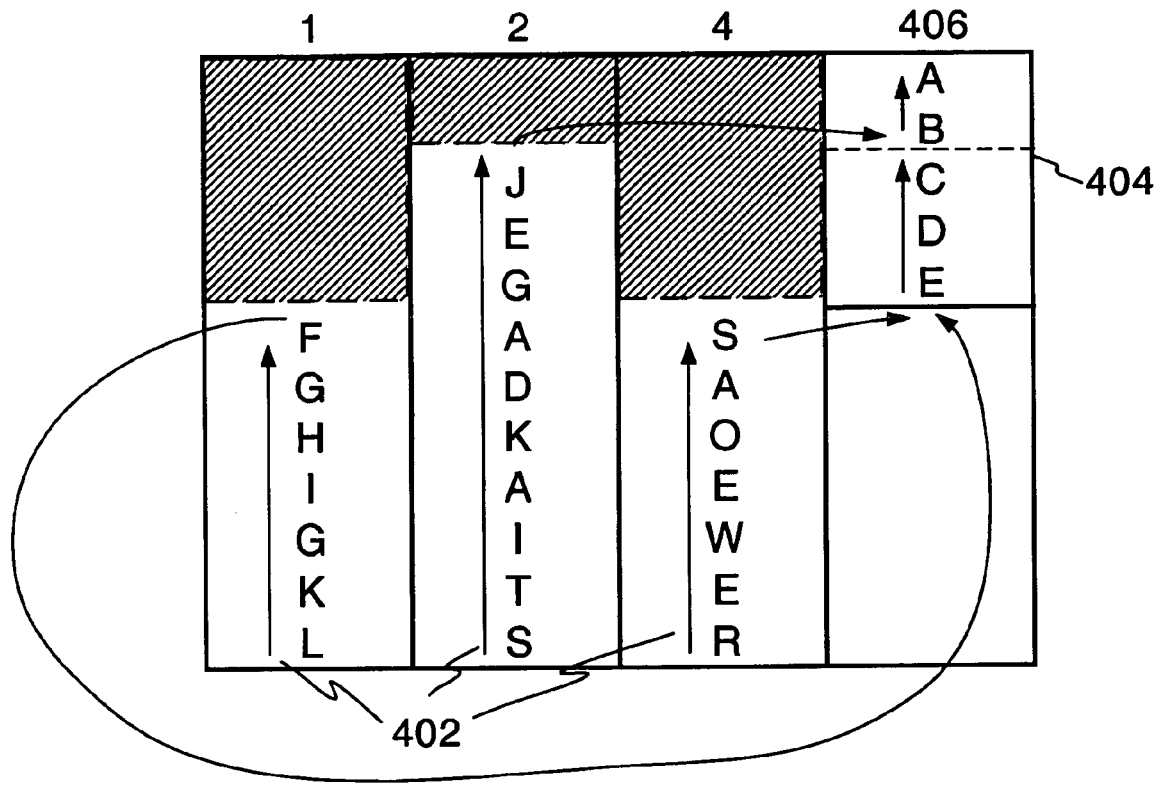
FIG. 4 depicts the program run of three basic slots near the block end after abstraction.

FIG. 4 discloses the result of the abstraction in relation to blocks 1,2, and 4. Arrows 402 illustrate the program flow within and between the blocks. The last five instructions of blocks 1 and 4, two of which are also common with block 2, are moved to a separate function 406 whereto the program flow is funneled from other blocks. As block 2 contains only two common instructions with function 406, an additional entry point 404 is created. After the function has been properly executed, the program flow returns to the caller block, although being not shown in the figure.

The presented invention is in principle a greedy algorithm, which is not, by theoretical means, guaranteed to achieve the global optimum, but in real life it performs well and has only $O(n^2)$ time complexity (where n is the number of basic blocks); i.e. gives good results when compared to the prior art solutions.

The algorithm can be implemented as described above or be optimized further.

It can be optimized for speed by splitting up the set of all basic blocks into many smaller sets so that it can be guaranteed that blocks in different sets do not have common suffixes. This way the algorithm retains its full strength and ideally its time complexity drops to $O(m \cdot (n/m)^2)$ if the blocks can be partitioned into m sets each set having the same number of elements.

Figure 5:
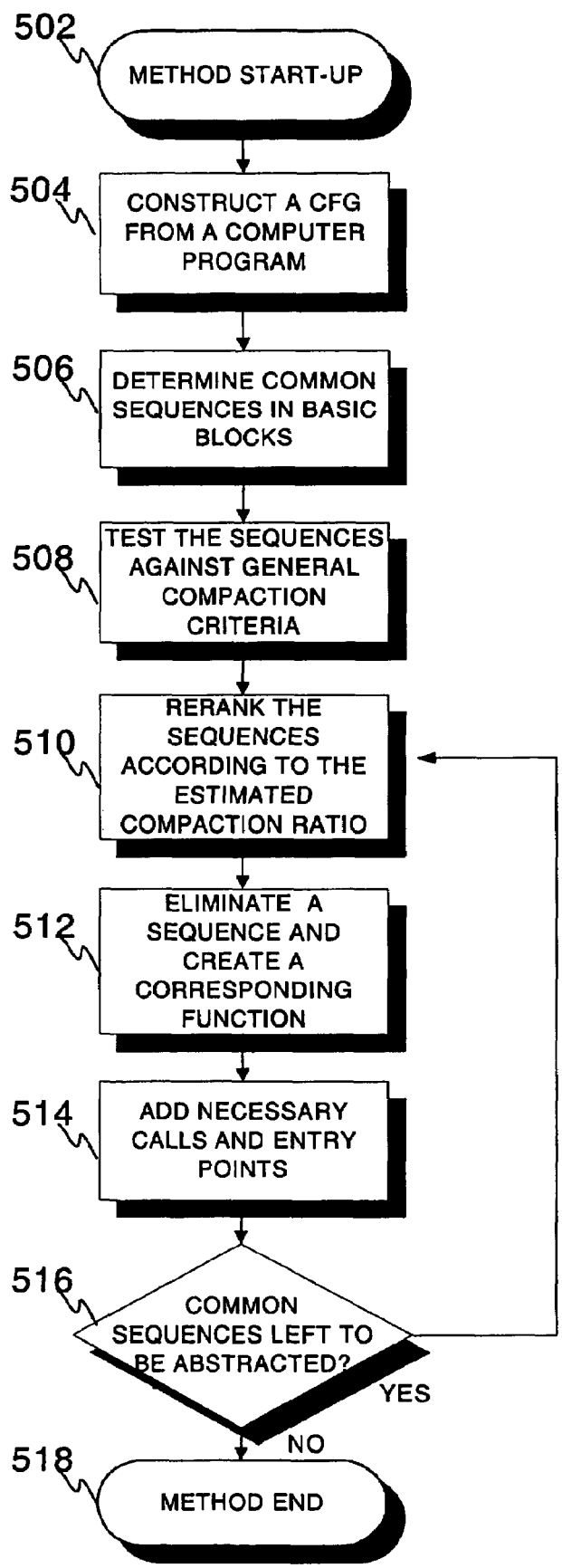
FIG. 5 is a flow diagram disclosing one option for performing the proposed method of procedural abstraction with tail merging.

FIG. 5 discloses a flow diagram of the proposed method. At start-up 502 the necessary preparations for the method execution are taken. For example, source program for CFG generation/code compacting and parameters controlling the compaction criteria (e.g. how short sequences may be considered relevant from the compacting standpoint) can be defined. In phase 504 the CFG is created from the code. This is performed by utilizing known techniques. Then the common sequences are searched for in phase 506. In a simple variation, the basic block ends including instructions and/or data may be compared with each other and the blocks carrying a common suffix marked with a certain identifier for later compression. Phase 508, wherein found sequences are tested against the compaction criteria, is optional but may turn out to be handy. Too short sequences (e.g. a minimum length criterion for abstraction) are maybe not worth compacting due to minimum code reduction gained and additional execution time introduced (because of required call and return type operations) etc. In phase 510 the sequences are ranked on the basis of achievable compaction ratio; the sequences that reduce the code size most are favoured. In loop of phases 512, 514, and 516 the sequence with best compaction ratio is first turned to a function and then multiple occurrences thereof are eliminated, call/branch/return control instructions are added and entry points defined, these phases being repeated until there are no sequences left to be abstracted. The method is ended in phase 518 including e.g. creation of a new, compacted program on the basis of the modified CFG.

Figure 6:
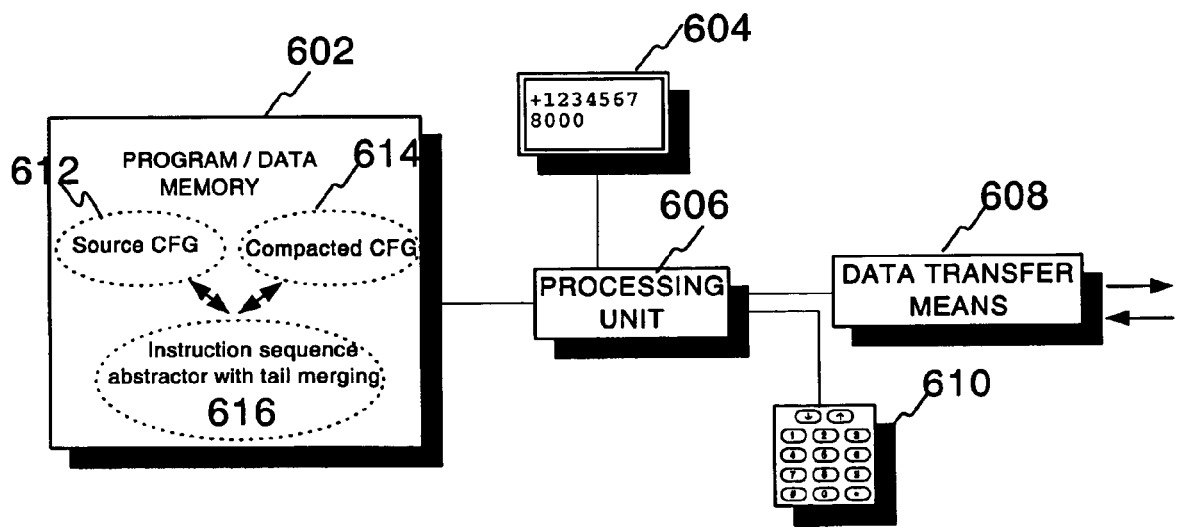
FIG. 6 is an exemplary block diagram of an electronic device like a pc computer capable of executing the method of the invention.

FIG. 6 depicts one option for basic components of a device like a pc computer capable of processing, storing, and optionally transferring data in accordance with the invention. A memory 602, divided between one or more physical memory chips, comprises necessary code 616, e.g. in a form of a computer program/application, and data, e.g. binary program and a CFG thereof 612, as an input for the proposed method producing a compacted CFG 614 as an output. A processing unit 606 is required for the actual execution of the method including the analysis and abstraction in accordance with instructions 616 stored in memory 602. Display 604 and keypad 610 are in principle optional but typically needed for providing necessary device control and data visualization means (~user interface) to the user. Data transfer means 608, e.g. a CD/floppy/hard drive or a network adapter, are required for handling data exchange, for example acquiring source data and outputting processed data, with other devices. The code 616 for the execution of the proposed method can be stored and delivered on a carrier medium like a floppy, a CD or a memory card. The method of the invention can be used to compact, for example, ARM/Thumb (Advanced RISC Machine) architecture specific code.

The scope of the invention can be found in the following claims. However, utilized devices, method steps, data structures etc may vary significantly depending on the current scenario, still converging to the basic ideas of this invention. For example, it is clear that the CFG acting as a source and destination entity for the procedural abstraction as presented hereinbefore can be constructed in a variety of ways, and there is no reason to expect that any single CFG build-up technique is the one to be utilized with the method of the invention.

References:

[1] Cristina Cifuentes, K. John Gough, A Methodology for Decompilation. XIX Conferencia Latinoamericana de Informática, Buenos Aires, Argentine, 2-6 Aug. 1993, pp. 257-266.

[2] Saumya K. Debray et al, Compiler Techniques for Code Compaction. ACM Transactions on Programming Languages and Systems vol. 22 no. 2, Mar. 2000, pp. 378-415.

[3] Dae-Hwan Kim, Hyuk Jae Lee, Iterative Procedural Abstraction for Code Size Reduction. In Proceedings of CASES 2002, October 2002, pp. 277-279.

The invention claimed is:

1. A method comprising:
  creating a control flow graph of a computer program having instruction sequences, said control flow graph including basic blocks of instructions, each basic block having a last instruction,
  traversing through the basic blocks in order to detect multiple occurrences of a same instruction sequence which includes said last instruction for each of at least two basic blocks,
  creating a function including a longest sequence of last instruction sequences common to said at least two basic blocks and which includes said last instruction for each of said at least two basic blocks, said longest sequence from a plurality of sequences of last instruction sequences common to said at least two basic blocks and having a common instruction sequence of equal or shorter length compared to said longest sequence, said longest sequence including the equal or shorter length sequences of said plurality of sequences, and replacing the original occurrences of said instruction sequences in said plurality of sequences with a reference to a proper position in said created function.

2. A method of claim 1, wherein the blocks are traversed in a direction opposite to execution of said blocks.

3. A method of claim 1, wherein said proper position is the position from which onward the sequence in the function matches with the original occurrence of the replaced instruction sequence.

4. A method of claim 1, wherein said reference is substantially a function call or a branch instruction.

5. A method of claim 1, wherein said created function contains substantially the at least two basic blocks whereto said longest sequence belongs.

6. A method of claim 1, wherein after creating the flow graph said basic blocks are divided into a plurality of block sets, said blocks in different sets comprising no common instruction sequences.

7. A storage medium carrying a computer executable program for carrying out the method of claim 1.

8. A computer program product comprising code stored on a readable storage medium for execution by a processing unit so as to carry out:
creating a control flow graph of a computer program having instruction sequences, said control flow graph including basic blocks of instructions, each basic block having a last instruction,
traversing through the basic blocks in order to detect multiple occurrences of a same instruction sequence which includes said last instruction for each of at least two basic blocks,
creating a function including a longest sequence of last instruction sequences common to said at least two basic blocks and which includes said last instruction for each of said at least two basic blocks, said longest sequence from a plurality of sequences of last instruction sequences common to said at least two basic blocks and having a common instruction sequence of equal or shorter length compared to said longest sequence, said longest sequence including the equal or shorter length sequences of said plurality of sequences, and
replacing the original occurrences of said instruction sequences in said plurality of sequences with a reference to a proper position in said created function.

9. An electronic device comprising:
a processing unit,
a memory for storing instructions and data, and
a data transfer module for accessing data,
said device arranged to create a control flow graph of a computer program having instruction sequences, said control flow graph including basic blocks of instructions, each basic block having a last instruction, said device further arranged to traverse through the basic blocks in order to detect multiple occurrences of a same instruction sequence which includes said last instruction for each of at least two basic blocks, to create a function including a longest sequence of last instruction sequences common to said at least two basic blocks and which includes said last instruction for each of said at least two basic blocks, said longest sequence from a plurality of sequences having a common instruction sequence of equal or shorter length compared to said longest sequence, said longest sequence including the equal or shorter length sequences of said plurality of sequences and to replace the original occurrences of said instruction sequences in said plurality of sequences with a reference to a proper position in said created function.

10. The electronic device of claim 9 further arranged so that the blocks are traversed in a direction opposite to execution of said blocks.

11. The electronic device of claim 9, arranged so that said proper position is the position from which onward the sequence in the function matches the original occurrence of the replaced instruction sequence.

12. The electronic device of claim 9, arranged so that said reference is substantially a function call or a branch instruction.

13. The electronic device of claim 9, arranged so that said created function contains substantially the at least two basic blocks whereto said longest sequence belongs.

14. The electronic device of claim 9, arranged so that after creating the flow graphs said basic blocks are divided into a plurality of block sets, said blocks in different sets comprising no common instruction sequences.

15. An electronic device comprising:
means for processing,
means for storing instructions and data, and
means for accessing data,
said device arranged to create a control flow graph of a computer program having instruction sequences, said control flow graph including basic blocks of instructions, each basic block having a last instruction, said device further arranged to traverse through the basic blocks in order to detect multiple occurrences of a same instruction sequence which includes said last instruction for each of at least two basic blocks, to create a function including a longest sequence of last instruction sequences common to said at least two basic blocks and which includes said last instruction for each of said at least two basic blocks, said longest sequence from a plurality of sequences having a common instruction sequence of equal or shorter length compared to said longest sequence, said longest sequence including the equal or shorter length sequences of said plurality of sequences and to replace the original occurrences of said instruction sequences in said plurality of sequences with a reference to a proper position in said created function.

16. The electronic device of claim 15, wherein the blocks are traversed in a direction opposite to execution of said blocks.

* * * * *